United States Patent
Dahl et al.

(10) Patent No.: US 10,275,921 B2
(45) Date of Patent: Apr. 30, 2019

(54) COMPUTER ARCHITECTURE FOR ANIMATION OF A MODEL IN A SIMULATION

(71) Applicant: Electronic Arts Inc., Redwood City, CA (US)

(72) Inventors: Tobias Dahl, Venice, CA (US); Andrew R. Konieczny, Playa Vista, CA (US)

(73) Assignee: ELECTRONIC ARTS, INC., Redwood City, CA (US)

( * ) Notice: Subject to any disclaimer, the term of this patent is extended or adjusted under 35 U.S.C. 154(b) by 82 days.

(21) Appl. No.: 15/282,799

(22) Filed: Sep. 30, 2016

(65) Prior Publication Data

US 2018/0096512 A1  Apr. 5, 2018

(51) Int. Cl.
*G06T 13/40* (2011.01)
*G06T 13/00* (2011.01)

(52) U.S. Cl.
CPC .............. *G06T 13/40* (2013.01); *G06T 13/00* (2013.01); *A63F 2300/6607* (2013.01)

(58) Field of Classification Search
None
See application file for complete search history.

(56) References Cited

PUBLICATIONS

Joseph Laszlo, Michiel van de Panne, Eugene Fiume, "Limit Cycle Control and Its Application to the Animation of Balancing and Walking", 1996, ACM, SIGGRAPH '96 Proceedings of the 23rd annual conference on Computer graphics and interactive techniques, pp. 155-162.*
S.A. Marsland, R.J. Lapeer, "Physics-based animation of a trotting horse in a Virtual Environment", Jul. 8, 2005, IEEE, Proceedings of the Ninth International Conference on Information Visualisation (IV'05).*
Nancy S. Pollard, Jessica K. Hodgins, Marcia J. Riley, Christopher G. Atkeson, "Adapting Human Motion for the Control of a Humanoid Robot", May 15, 2002, IEEE, Proceedings of the 2002 IEEE International Conference on Robotics & Automation, pp. 1390-1397.*
Deborah A. Carlson, Jessica K. Hodgins, "Simulation Levels of Detail for Real-time Animation", 1996, Georgia Institute of Technology, Technical Report, GIT-GVU-96-32.*
Sujeong Kim, Stephane Redon, Young Kim, "View-Dependent Dynamics of Articulated Bodies", Aug. 6, 2008, Wiley, Computer Animation and Virtual Worlds.*
M. Servin, C. Lacoursière, F. Nordfelth, "Adaptive resolution in physics based virtual environments", Nov. 28, 2008, Linköping University Electronic Press, SIGRAD 2008. The Annual SIGRAD Conference Special Theme: Interaction, Issue 34, Article 12, pp. 47-52.*

* cited by examiner

*Primary Examiner* — Robert Bader
(74) *Attorney, Agent, or Firm* — McDermott Will & Emery LLP

(57) ABSTRACT

Methods for improving movement animation of a model in a simulation are provided. In one aspect, a method includes receiving a movement input for the model, the model includes interconnected joints having respective current locations. Updated locations for each joint are determined based on the movement input and the current locations. Modified locations for each joint are determined based on parameters of a control loop that introduces an error between the current locations and the updated locations. The model is rendered based on the modified locations. Systems and machine-readable media are also provided.

20 Claims, 6 Drawing Sheets

COMPUTER ARCHITECTURE FOR ANIMATION OF A MODEL IN A SIMULATION

TECHNICAL FIELD

The present disclosure generally relates to computer architecture for animation of a model in a simulation of real-world events, and more specifically relates to computer architecture for movement animation of the model. The present disclosure describes improved resource utilization to produce movement animations without requiring significant extra processing or hardware.

BACKGROUND

Video games, such as sports video games, provide ever increasing realistic game-playing experiences. Although a video game engine may recreate objects and characters in a simulation, the objects and characters may be animated to move unrealistically. The objects and characters may move as if real world physics were not applicable.

The description provided in the background section should not be assumed to be prior art merely because it is mentioned in or associated with the background section. The background section may include information that describes one or more aspects of the subject technology.

SUMMARY

The disclosed system provides for animating a model in a simulation using parameters in a control loop to introduce errors in the movement. The parameters may be applied to calculate updated locations for each joint of the model.

According to certain aspects of the present disclosure, a computer-implemented method for improving movement animation of a model in a simulation is provided. The method includes receiving a movement input for the model. The model includes a plurality of interconnected joints having respective current locations. The method includes determining, based on the movement input and the current locations, updated locations for each of the plurality of joints. The method includes determining, based on at least one parameter of a control loop configured to introduce an error between the current locations and the updated locations, modified locations for each of the plurality of joints. The method includes rendering the model based on the modified locations.

According to certain aspects of the present disclosure, a system for improving movement animation of a model in a simulation is provided. The system includes a memory comprising instructions, and a processor configured to execute the instructions. The processor is configured to execute the instructions to receive a movement input for the model. The model includes a plurality of interconnected joints having respective current locations. The processor is configured to execute the instructions to determine, based on the movement input and the current locations, updated locations for each of the plurality of joints. The processor is configured to execute the instructions to determine modified locations for each of the plurality of joints, based on at least one parameter of a proportional-integral-derivative (PID) controller. The PID controller is configured to introduce an error between the current locations and the updated locations. The processor is configured to execute the instructions to render the model based on the modified locations.

According to certain aspects of the present disclosure, a non-transitory machine-readable storage medium comprising machine-readable instructions for causing a processor to execute a method for improving movement animation of a model in a simulation is provided. The method includes receiving a movement input for the model. The model includes a plurality of interconnected joints having respective current locations. The method includes determining, based on the movement input and the current locations, updated locations for each of the plurality of joints. The method includes determining modified locations for each of the plurality of joints, based on at least a proportional modifier, an integral modifier, and an input modifier of a proportional-integral-derivative (PID) controller. The PID controller is configured to introduce an error between the current locations and the updated locations. The proportional modifier corresponds to a present deviation, the integral modifier corresponds to an accumulation of past deviations, and the input modifier corresponds to a prediction of future deviations. The method includes rendering the model based on the modified locations.

According to certain aspects of the present disclosure, a system for improving movement animation of a model in a simulation includes means for receiving a movement input for the model. The model includes a plurality of interconnected joints having respective current locations. The system also includes means for determining, based on the movement input and the current locations, updated locations for each of the plurality of joints. The means for determining are further configured for determining modified locations for each of the plurality of joints, based on at least a proportional modifier, an integral modifier, and an input modifier of a proportional-integral-derivative (PID) controller. The PID controller is configured to introduce an error between the current locations and the updated locations. The proportional modifier corresponds to a present deviation, the integral modifier corresponds to an accumulation of past deviations, and the input modifier corresponds to a prediction of future deviations. The means for determining are further configured for rendering the model based on the modified locations.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for improving movement animation of a model in a simulation. For example, by using a PID controller to introduce an error, corresponding to an overlap exhibited by real-world physics, to the movement animation, the movement animation may simulate real-world movement.

The disclosed system addresses a technical problem tied to computer technology and arising in the realm of computer networks, namely the technical problem of efficient and accurate movement animation of a model in a simulation. The disclosed system solves this technical problem by a technical solution of introducing error in the movement. The error may correspond to overlap, for example overshooting and/or undershooting the desired movement. The movement animation may be made more accurate through additional processing, such as implementing a robust physics engine. However, the additional processing may require additional resources, such as additional time to complete the processing, additional memory for running the robust physics engine, or hardware capable of such processing without requiring the additional time, which may affect a user's access to the simulation and usability of the simulation. The disclosed system uses a control loop, such as a PID controller, to improve the simulation results, to produce movement animation that simulates overlap exhibited in real-world movement, and requiring less processing than implementing the robust physics engine.

While many examples are provided herein in the context of a video game, the principles of the present disclosure contemplate other types of simulations as well. For example, military simulations, medical simulations, emergency response simulations, choreography simulations, motion picture simulations, and other simulations involving moving objects or people simulating realistic movement are all considered within the scope of the present disclosure.

Example System Architecture

Figure 1:
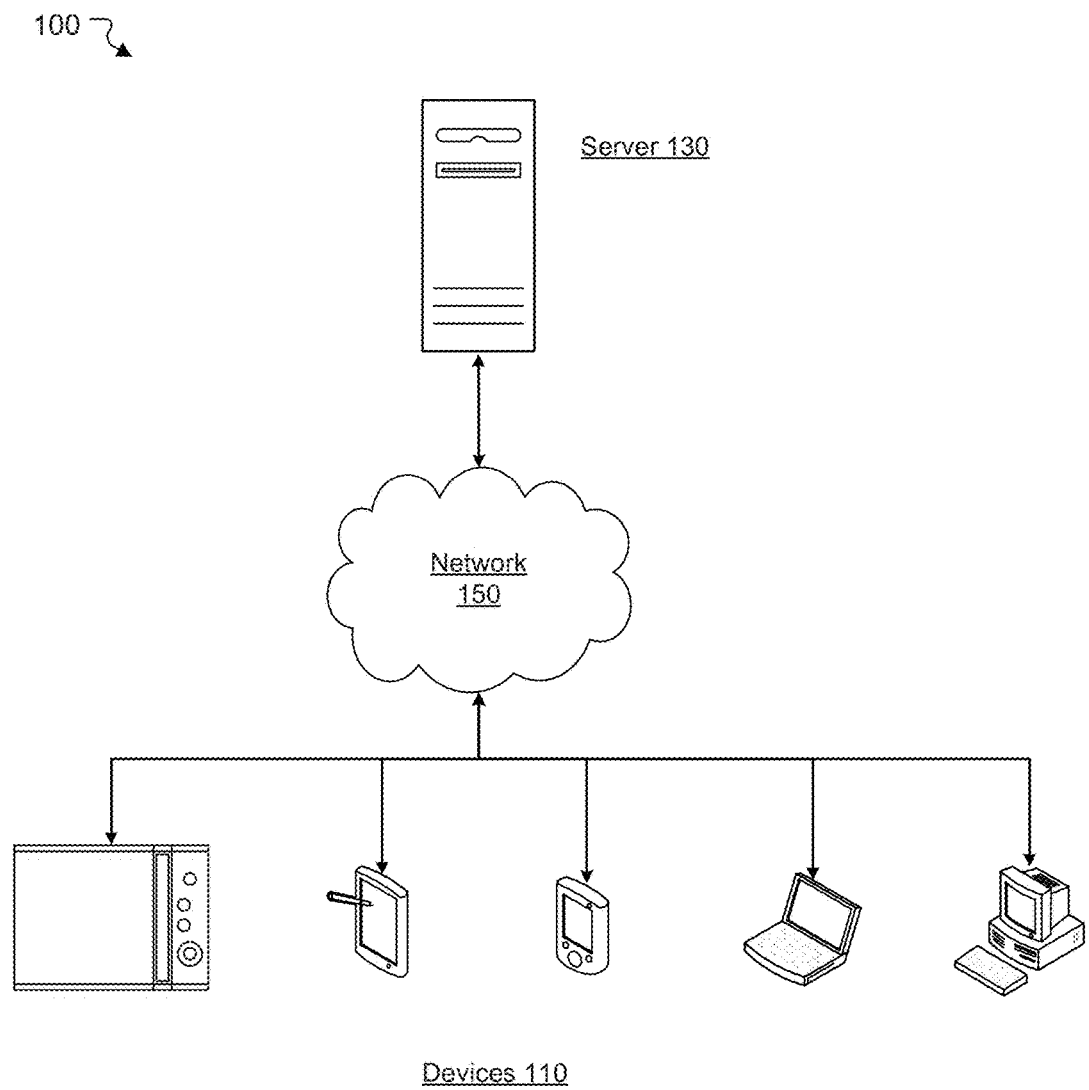
FIG. 1 illustrates an example architecture for improving movement animation of a model in a simulation.

FIG. 1 illustrates an example architecture 100 for improving simulation of a sporting event by using real-world data to seed the simulation. The architecture 100 includes one or more servers 130 and devices 110 connected over a network 150.

One of the many servers 130 is configured to host application data, such as application data for a simulation or video game. For purposes of load balancing, multiple servers 130 can host the application data. The server 130 may further be configured to host simulations for multiple devices 110. For example, the server 130 may host a multiplayer simulation for multiple devices 110 to connect to, such that the multiple devices 110 experience the same simulation at approximately the same time.

The devices 110 include one or more computing devices. The devices 110 may include devices capable of running a simulation engine, such as a sports game, for simulating sporting events, a first person shooter (FPS) game, a first person video game, a driving simulator game, an open world (or free roam or sandbox) game, or any other type of simulation or game having objects move according to simulated real-world physics. For example, the devices 110 may include stationary video game consoles, tablets, mobile devices, laptop computers, desktop computers, and/or other devices capable of running a sports game.

The disclosed system uses application data to coordinate the simulations across the devices 110. The server 130 sends the portions of the application data to one or more devices 110, which uses the application data to run similar instances of the simulation. As such, the disclosed system can, for example, create a consistent simulation across the devices 110.

In addition, according to certain aspects of the disclosure, the simulation may be hosted locally, for example on one of the devices 110, or between two or more devices 110 such that application data is shared between the devices 110 rather than being generated by the server 130.

The servers 130 can be any device having an appropriate processor, memory, and communications capability for hosting real-world data. The devices 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Simulation of a Sporting Event

Figure 2:
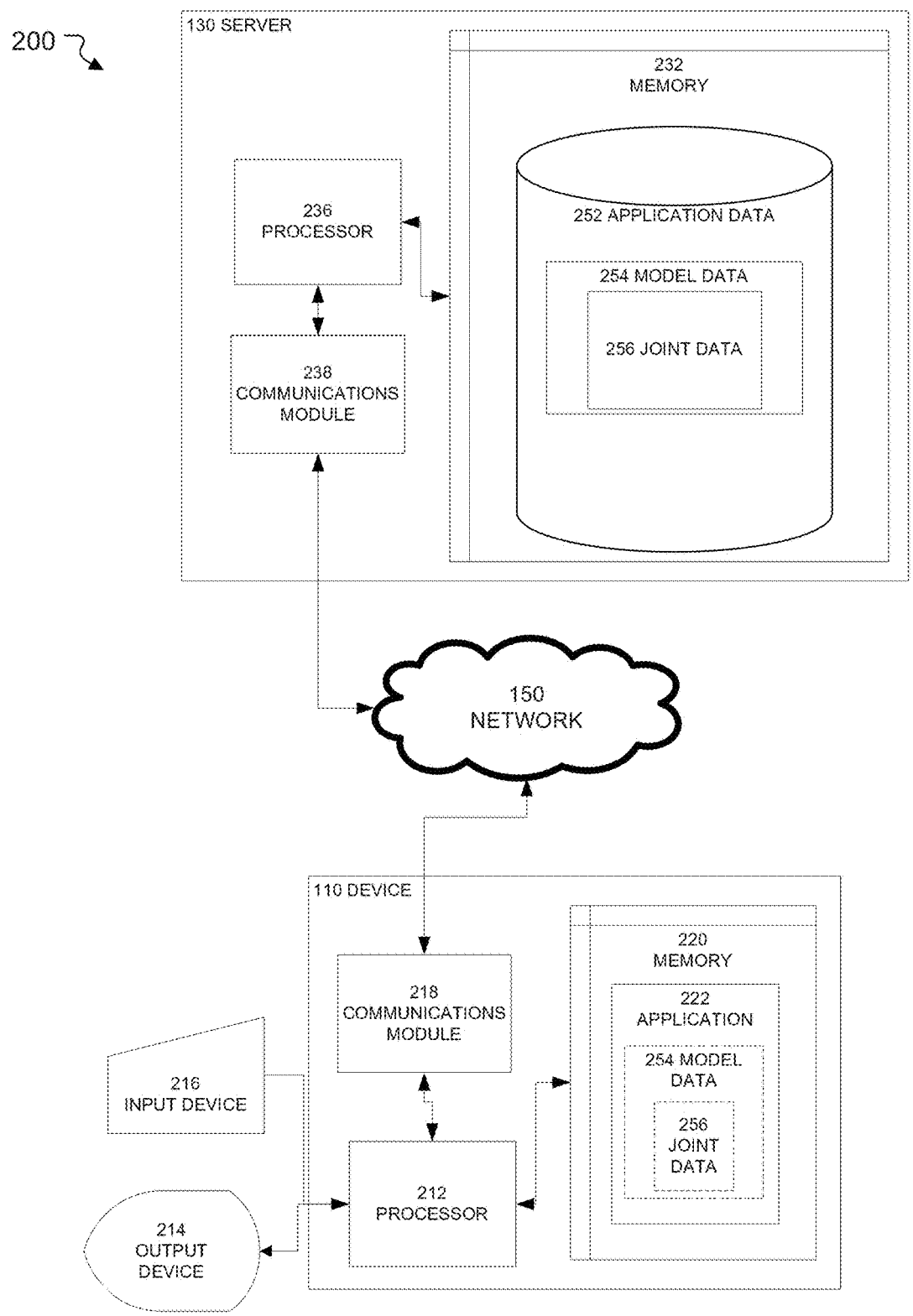
FIG. 2 is a block diagram illustrating the example device and server from the architecture of FIG. 1 according to certain aspects of the disclosure.

FIG. 2 is a block diagram 200 illustrating an example server 130 and device 110 in the architecture 100 of FIG. 1 according to certain aspects of the disclosure.

The device 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes application data 252. The application data 252 corresponds to data for hosting a simulation, such as a multiplayer video game. The application data 252 may include data for generating the simulation, such as models of the environment (e.g., maps), textures, environment variables and parameters, and other data for generating the simulation. Although the present disclosure describes the simulation as a multiplayer video game, in other implementations the simulation may allow spectators to view the simulation without controlling objects or characters within the simulation.

The processor 236 of the server 130 is configured to execute instructions, such as instructions physically coded into the processor 236, instructions received from software in memory 240, or a combination of both. For example, the processor 236 of the server 130 executes instructions to send at least a portion of the application data 252 to one or more devices 110. The application data 252 includes model data 254, which includes joint data 256.

The model data 254 includes data for defining models of every object in the simulation, which may include characters, vehicles, and other player controllable objects. The joint data 256 includes data on joints—corresponding to rotation or translation points—such as between "bones," used herein to describe solid portions of the models connected at the joints. The joint data 256 includes location data, defining each joint's location in reference to the simulation environment, which bones are connected to the joint, and may further include additional parameters, such as types of rotations or translations associated with the joint and any limitations such as maximum angle or minimum angle or other threshold angle.

The model data 254 may be based on an animation technique used in the simulation. For example, a skeletal animation technique uses a hierarchical set of interconnected bones (e.g. a skeleton or rig) with a surface representation (e.g. skin or mesh). Each bone has a three-dimensional transformation, including position, scale, and orientation. The transformation of each bone includes transformations of any parent bones in the hierarchy. For example, moving an arm bone would also move a hand bone which is a child of the arm bone. Each bone is skinned to complete the visual representation of the model, for example by applying a polygonal mesh based on vertices associated with the bone. Although the model data 254 is described with respect to skeletal animation, other animation techniques and corresponding model data may be used, and the control loop transformations described herein may be accordingly applied to the model data.

Although FIG. 2 depicts the application data 252, the model data 254, and the joint data 256 in the memory 232 of the server 130, in other implementations the memory 220 of the device 110 may include the application data 252, the model data 254, and the joint data 256, or local copies thereof.

For each frame of animation, the models corresponding to the model data 254 have gamestates, which may include for each joint and/or bone, pitch, roll, yaw, directional movement, left and right, etc. The gamestates may incorporate user movement inputs or other movement inputs, such as object movement in response to the environment or other moving objects. Based on the gamestates, joint transformations are calculated for each joint and/or bone. The joint transformations may be further modified, for example based on limits on the joint and/or bone, environmental limits or restrictions, environmental effects, etc. Based on the joint transformations, the joints and/or bones are repositioned to render the next frame.

According to certain aspects of the disclosure, one or more PID controllers are implemented. For each frame, each incoming gamestate may have a corresponding PID controller. Each PID controller takes each incoming gamestate and introduces PID error to produce a corresponding outgoing gamestate. The joint transformations are modified using the PID error, and the joint transforms are then modified per state. Based on the modified joint transformations, the joints and/or bones are repositioned to render the next frame.

The device 110 includes a processor 212, the communications module 218, and the memory 220 that includes the application 222. The application 222 may be a simulation engine, or software capable of simulating moving objects, such as a video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in memory 220, or a combination of both. The processor 212 of the device 110 executes instructions from the application 222 causing the processor 212 to receive a movement input for a model in a simulation corresponding to the application 222. The model includes interconnected joints having current locations. The received movement input may correspond to a user input from the input device 216, or may correspond to a movement based on a contact with another model in the simulation. Executing the instructions also causes the processor 212 to determine, based on the movement input and the current locations, updated locations for each of the joints. Executing the instructions also causes the processor 212 to determine, based on at least one parameter of a control loop configured to introduce an error between the current locations and the updated locations, modified locations for each of the joints. The control loop may correspond to a PID controller. The at least one parameter may include a proportional modifier corresponding to a present deviation, an integral modifier corresponding to an accumulation of past deviations, an input modifier corresponding to a prediction of future deviations, and a threshold angle corresponding to a threshold joint movement. Executing the instructions also causes the processor 212 to render the model based on the modified locations.

Executing the instructions also causes the processor 212 to modify joint transformations using the proportional modifier, integral modifier, and input modifier. The joint transformations may be set according to the threshold angle when the modification exceeds the threshold angle. Executing the instructions also causes the processor 212 to perform the determining the updated locations, the determining the modified locations, and the rendering the model for each frame of the movement animation. Executing the instructions also causes the processor 212 to interpolate between the updated location and a location corresponding to the threshold angle when the joint transformation approaches the threshold angle.

Executing the instructions for receiving the player positional data may also cause the processor 212 to determine the modified locations of the joints based on a distance of the model from a virtual camera. For example, the model may be beyond a threshold distance from the virtual camera. The error introduced by the PID controller may not significantly impact the rendering of the model beyond the threshold distance, and therefore may be reduced or disabled. In other words, the model may be far away enough from the virtual camera that the movement animation may not require the PID controller modification. Processing may be reduced by disabling the PID controller modification beyond the threshold distance.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
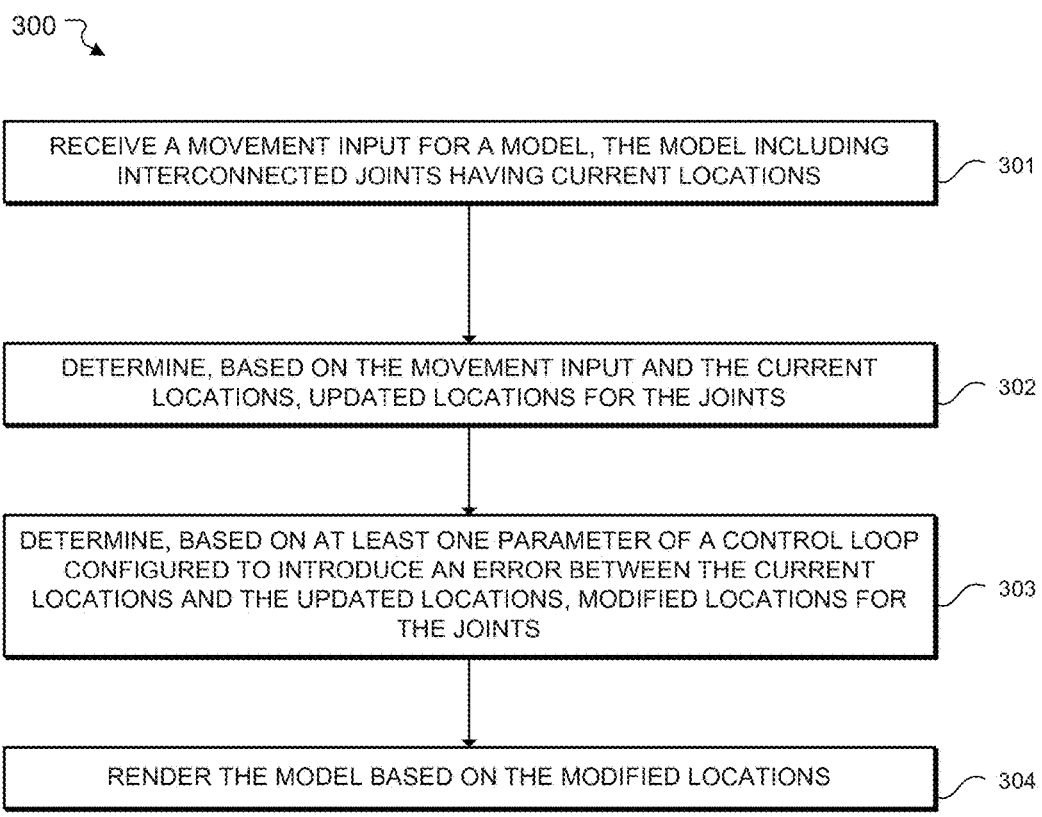
FIG. 3 illustrates an example process for improved movement animation of a model in a simulation using the example device/server of FIG. 2.

FIG. 3 illustrates an example process 300 for improving movement animation of a model in a simulation, using the example device 110 of FIG. 2. While FIG. 3 is described with reference to FIG. 2, it should be noted that the process steps of FIG. 3 may be performed by other systems. In addition, the process 300 is not limited to the specific order of steps presented in FIG. 3.

The process 300 begins by proceeding to step 301 when, for example, the device 110 receives a movement input for a model. The model corresponds to the model data 254. The model includes interconnected joints having current locations, which correspond to the joint data 256. The current locations may correspond to a current pose or animation frame of the model. The movement input may be received from the input device 216. Alternatively, the movement input may correspond to contact with another model in the simulation. For example, another model may have moved—from a user input or another moving object in the environment—hereby causing contact with the model, which also causes the model to move.

Figure 4:
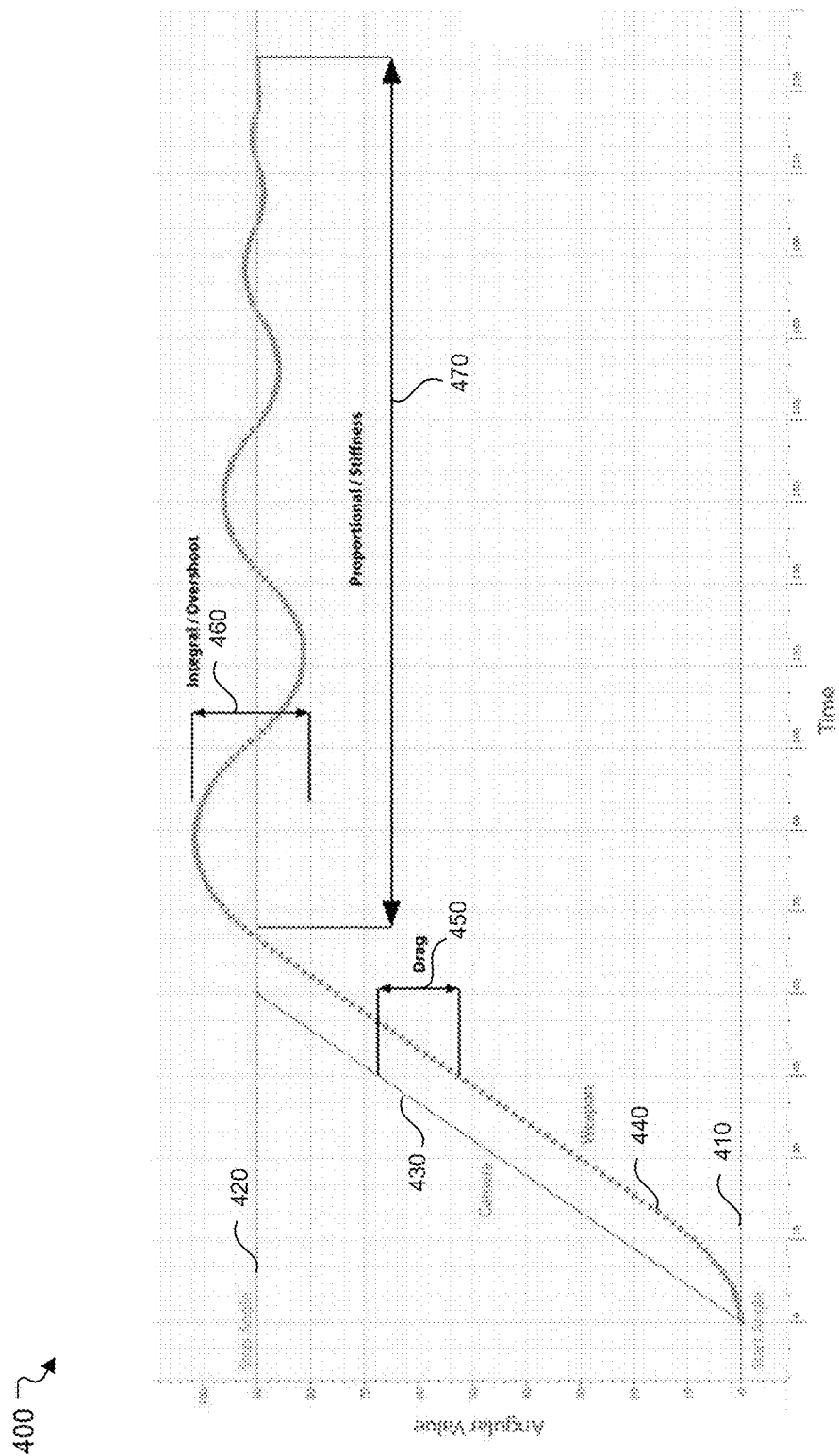
FIG. 4 is an example graph of PID error according to certain aspects of the disclosure.

FIG. 4 shows an example graph 400 of PID error according to certain aspects of the disclosure. The graph 400 includes a start value 410, a stop value 420, an input 430, a model curve 440, a drag error 450, an integral error 460, and a proportional error 470. The start value 410 corresponds to the current location of a joint in step 301. The input 430 corresponds to the movement input in step 301. The model curve 440 shows the angular value of the joint over time, for example each frame of animation. The input 430 may correspond to a user input for moving a virtual camera of the simulation, which may be a first-person video game, and the model curve 440 may correspond to a model of a weapon of the first-person video game, which can be seen by the virtual camera. More specifically, the virtual camera may correspond to the user's first-person view, and the weapon may be seen in the view. However, in other implementations the input 430 may correspond to another movement input, and the model curve 440 may correspond to another model in the simulation. The movement input may correspond to any kind of input that can derive or cause the model to move. For example, the input 430 may correspond to a force applied to the model, and the model curve 440 may correspond to a component of the model, such as a body part, limb, or other object component. In addition, although FIG. 4 depicts angular values, corresponding to gamestates such as pitch, roll, or yaw which utilize angular values, in other implementations other dimensions, such as distance, may be used.

Returning to FIG. 3, at step 302, the device 110 determines, based on the movement input and the current locations, updated locations for the joints. In FIG. 4, based on the start value 410 and the input 430, the stop value 420 is determined. The stop value 420 corresponds to the updated locations, which also corresponds to the destination indicated by the movement input.

The destination may correspond to a new location from the current location based on a magnitude and direction of the input 430. Alternatively, the destination may correspond to a specific pose for the model, for example as part of an animation sequence corresponding to the movement input. The pose may include joint locations. The animation sequence may include poses for each time slice of the animation sequence.

At step 303, the device 110 determines, based on at least one parameter of a control loop configured to introduce an error between the current locations and the updated locations, modified locations for the joints. For example, a PID controller may be configured to introduce error between the current location and the updated location. Parameters for the PID controller may include one or more of a proportional modifier, an integral modifier, an input modifier, and a threshold angle. The proportional modifier corresponds to a present deviation from the updated location. The integral corresponds to an accumulation of past deviation. The input modifier corresponds to a prediction of future deviations. The threshold angle corresponds to a threshold joint movement, such as a minimum angle or maximum angle which the joint may move. Any joint transformations which exceeds the threshold angle may be instead be set to the threshold angle rather than incorporating the PID error. In addition, if the joint transformation approaches the threshold angle, for example if the joint transformation is within a threshold offset from the threshold angle, the joint transformation may instead interpolate between the current location and the updated location rather than incorporating the PID error.

In FIG. 4, the start value 410 may correspond to the user's first person view. The weapon normally remains centered in the view, for example when the user's player is standing still or otherwise not moving, to allow the user to aim. When the user inputs the input 430 to move the weapon to re-aim, the weapon may follow exactly the input 430 to the stop value 420. Although such movement keeps the weapon centered throughout the animation for the re-aiming, such movement does not look realistic. For instance, because objects in the real world have mass and exhibit inertia when moving and stopping, the weapon in the real world would not follow exactly the input 430 to the stop value 420.

The PID controller introduces PID error to the movement to simulate the effects of inertia without requiring additional computations to estimate actual inertia for the model having a simulated mass. As seen in FIG. 4, the PID controller adds the drag error 450, the integral error 460, and the proportional error 470 such that the model curve 440 does not follow exactly the input 430. The PID controller adds lagging behavior, from the drag error 450, such that the model lags behind the input 430. The PID controller also adds overlap behavior, from the integral error 460 and the proportional error 470, such that the model overshoots and undershoots the stop value 420 several times before stopping at the stop value 420.

The proportional modifier may adjust the proportional error 470, which corresponds to a stiffness of the movement. The stiffness corresponds to how many oscillations before the model settles on the stop value 420. The integral modifier may adjust the integral error 460, which corresponds to magnitude of overshoot. The input modifier may adjust the drag error 450, which corresponds to magnitude of lag behind the input 430.

For a given model, there may be a PID controller for each joint of the model, such that there is at least one PID calculation per joint. Thus, there may be multiple PID controllers running concurrently for each of the models in the simulation.

Figure 5B:
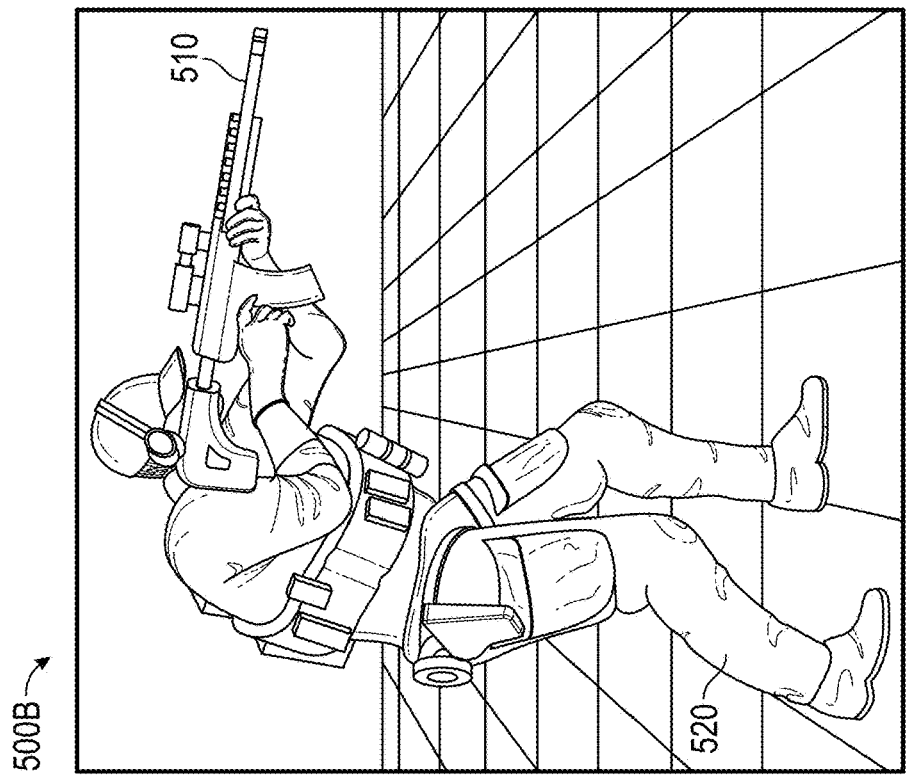
FIG. 5B is an example illustration of the frame of animation of FIG. 5A with PID error applied.
Figure 5A:
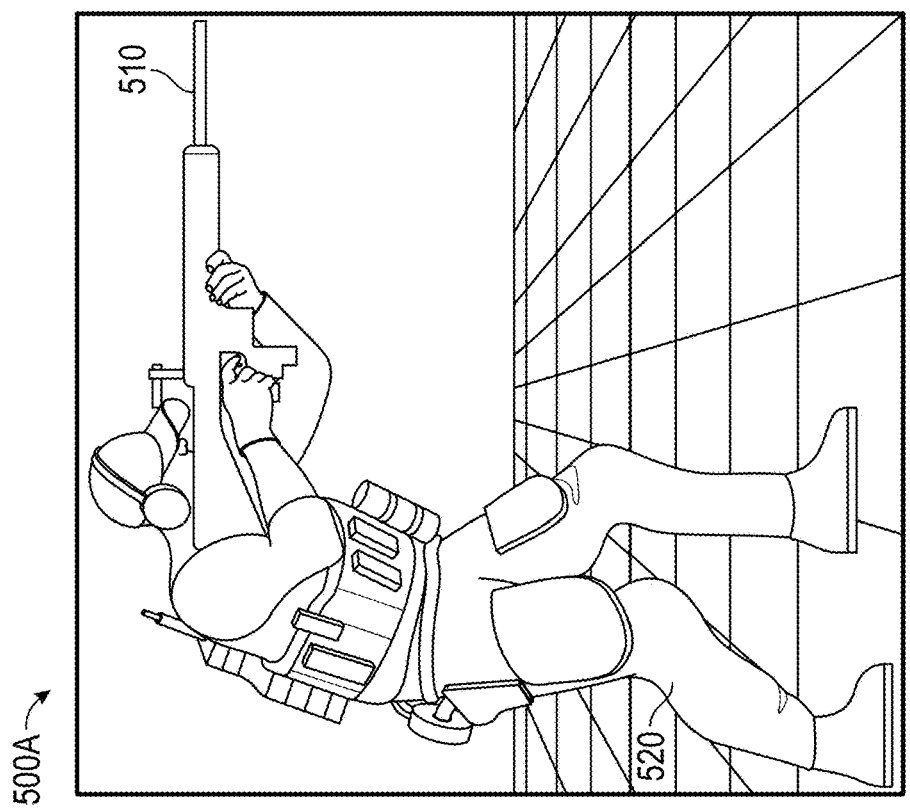
FIG. 5A is an example illustration of a frame of animation without PID error applied.

At step 304, the device 110 renders the model based on the modified locations. The device 110 displays the rendered model on the output device 214. FIG. 5A shows a frame 500A of an animation without PID error, and FIG. 5B shows a frame 500B of the animation with PID error. The frames 500A and 500B may correspond to the same frame of animation, for example a frame in which a character model 520, holding a weapon model 510, has just touched down on the ground after a jumping motion.

In FIG. 5A, the weapon model 510 is level. However, a person holding a weapon having mass would normally not be able to keep the weapon level when the person lands from a jump. In FIG. 5B, the weapon model 510 is not level, but rather tilted downwards, due to the introduction of the PID error. For example, the integral modifier may have introduced an overshoot such that the weapon model 510 tilts downward. The integral modifier and the input modifier may also affect the final tilt angle of the weapon model 510 in FIG. 5B. In addition, the character model 520 is also affected by the tilting of the weapon model 510. For example, the hands and arms of the character model 520 are accordingly modified based on the tilting of the weapon model 510. The PID error simulates inertia, such that a more realistic pose is rendered for the weapon model 510 and the character model 520.

In another example, the model data 254 may correspond to a vehicle model and a character model driving the vehicle model. The vehicle model may be driving over terrain. The PID error may be introduced to change how the vehicle model responds to the terrain. For example, if the terrain is bumpy, the PID error may be applied to simulate a suspension of the vehicle model such that a body of the vehicle model may oscillate independently of tires of the vehicle model. Portions of the vehicle model may tilt at different speeds. For example, when the vehicle model stops, the body of the vehicle model may tilt forward and oscillate before settling to a stop. In addition, based on the motion of the vehicle model, the character model may also move. For example, if the body of the vehicle model is oscillating, the character model will also oscillate with the body, and further portions of the character model, such as limbs, will further move based on additional PID error introduced to the limbs.

The steps 301-304 may repeat for each frame of animation. In other words, the movement input may correspond to an animation sequence. For each frame of the animation sequence, the current pose is evaluated (step 301), the pose is updated (step 302), the PID controller input is added and transformation applied to the pose (step 303) and the model is rendered for the frame based on the transformation (step 304).

Because the PID error may be introduced as a post process for the animation rendering, the PID error may be further adjusted based on performance or user considerations. For example, in certain situations PID error may not be applied in order to reduce processing. PID error may be adjusted based on line of sight. The PID error may not be applied to models that are outside of the user's view. In a multiplayer simulation, in which the server 130 manages the simulation and the devices 110 recreates local instances of the simulation based on the server 130, the devices 110 may locally apply PID error to models in the corresponding views. In a peer-to-peer simulation, each peer device 110 may apply PID error to the same models.

If a model is beyond a threshold distance from the camera, the PID error may be reduced as the distance is increased and may be disabled beyond a second threshold distance from the camera. In other situations, such as when accurate and consistent collision detection is required across the devices 110, the PID error may also be disabled. In addition, if a threshold number of models in view is reached, a threshold number of joints is reached—which may correspond to the threshold number of models—or a threshold number of PID controllers (or other control loops) is reached, additional PID controllers may be disabled.

In certain other situations, such as when the user requires responsiveness or precise input, the PID error may be disabled. For example, the PID error-based animation may be immediately disabled based on specific user inputs, including if the user is firing the weapon in the first-person video game.

Hardware Overview

Figure 6:
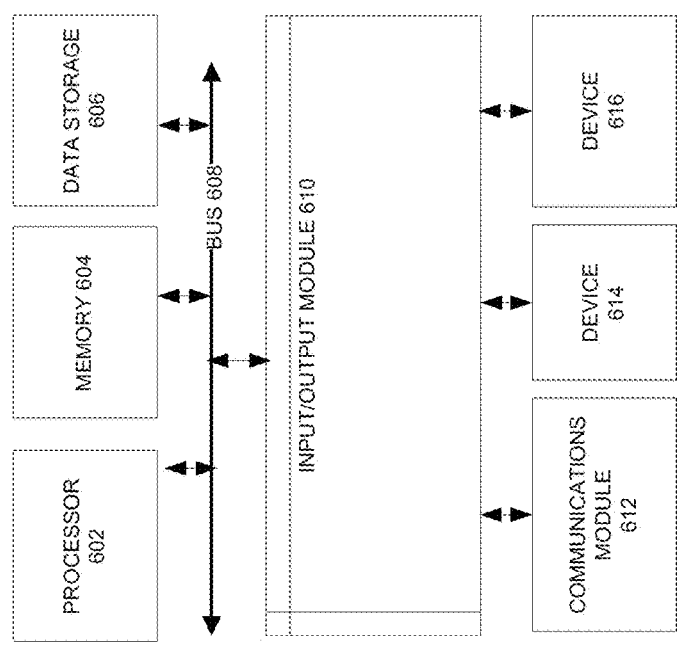
FIG. 6 is a block diagram illustrating an example computer system with which the devices and server of FIG. 2 can be implemented.

FIG. 6 is a block diagram illustrating an example computer system 600 with which the device 110 and server 130 of FIGS. 1 and 2 can be implemented. In certain aspects, the computer system 600 may be implemented using hardware or a combination of software and hardware, either in a dedicated server, or integrated into another entity, or distributed across multiple entities.

Computer system 600 (e.g., device 110 and server 130) includes a bus 608 or other communication mechanism for communicating information, and a processor 602 (e.g., processor 212 and 236) coupled with bus 608 for processing information. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 600 may be implemented with one or more processors 602. Processor 602 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 232 or 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry. Expansion memory may also be provided and connected to computer system 600 through input/output module 610, which may include, for example, a SIMM (Single In Line Memory Module) card interface. Such expansion memory may provide extra storage space for computer system 600, or may also store applications or other information for computer system 600. Specifically, expansion memory may include instructions to carry out or supplement the processes described above, and may include secure information also. Thus, for example, expansion memory may be provided as a security module for computer system 600, and may be programmed with instructions that permit secure use of computer system 600. In addition, secure applications may be provided via the SIMM cards, along with additional information, such as placing identifying information on the SIMM card in a non-hackable manner.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices (e.g., input device 216 and/or output device 214). The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. Example communications modules 612 (e.g., communications modules 238 and/or 218) include networking interface cards, such as Ethernet cards and modems.

The components of the system can be interconnected by any form or medium of digital data communication, e.g., a communication network. The communication network (e.g., communication network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 612 sends and receives electrical, electromagnetic or optical signals that carry digital data streams representing various types of information. The network link typically provides data communication through one or more networks to other data devices. For example, the network link of the communications module 612 may provide a connection through local network to a host computer or to data equipment operated by an Internet Service Provider (ISP). The ISP in turn provides data communication services through the world-wide packet data communication network now commonly referred to as the "Internet." The local network and Internet both use electrical, electromagnetic or optical signals that carry digital data streams. The signals through the various networks and the signals on the network link and through communications module 612, which carry the digital data to and from computer system 600, are example forms of transmission media.

Computer system 600 can send messages and receive data, including program code, through the network(s), the network link and communications module 612. In the Internet example, a server might transmit a requested code for an application program through Internet, the ISP, the local network and communications module 612. The received code may be executed by processor 602 as it is received, and/or stored in data storage 606 for later execution.

In certain aspects, the input/output module 610 is configured to connect to a plurality of devices, such as an input device 614 (e.g., input device 216) and/or an output device 616 (e.g., output device 214). Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 616 may include appropriate circuitry for driving the output device 616 to present graphical and other information to a user.

According to one aspect of the present disclosure, the device 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that include bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 608. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for improving movement animation of a model in a simulation comprising:
   receiving a movement input for the model, the model comprising a plurality of interconnected joints having respective current locations;
   determining, based on the movement input and the current locations, updated locations for each of the plurality of joints;
   determining, based on at least one parameter of a control loop configured to introduce an error between the current locations and the updated locations, modified locations for each of the plurality of joints;
   rendering the model based on the modified locations; and
   reducing or disabling the introduction of error to at least a subset of the plurality of joints based on receiving a user input requiring increased responsiveness or precision from the model.

2. The computer-implemented method of claim 1, wherein the at least one parameter comprises a proportional modifier corresponding to a present deviation, an integral modifier corresponding to an accumulation of past deviations, an input modifier corresponding to a prediction of future deviations, and a threshold angle corresponding to a threshold joint movement.

3. The computer-implemented method of claim 2, wherein determining the modified locations further comprises modifying joint transformations using the proportional modifier, integral modifier, and input modifier, wherein the joint transformations are set according to the threshold angle when the modification exceeds the threshold angle.

4. The computer-implemented method of claim 3, wherein determining the updated locations, determining the modified locations, and rendering the model is performed for each frame of the movement animation.

5. The computer-implemented method of claim 3, wherein modifying the joint transformations further comprises interpolating between the updated location and a location corresponding to the threshold angle when the joint transformation approaches the threshold angle.

6. The computer-implemented method of claim 1, wherein the received movement input corresponds to a user input.

7. The computer-implemented method of claim 1, wherein the received movement input corresponds to a contact with another model in the simulation.

8. The computer-implemented method of claim 1, wherein determining the modified locations further comprises determining the modified locations based on a distance of the model from a virtual camera.

9. The computer-implemented method of claim 1, wherein determining the modified locations further comprises determining the modified locations only for joints corresponding to a threshold number of models in view.

10. The computer-implemented method of claim 1, wherein determining the modified locations further comprises determining the modified locations for each of the plurality of joints based on a control loop for each joint of the plurality of joints.

11. The computer-implemented method of claim 10, wherein determining the modified locations further comprises determining the modified locations based on up to a threshold number of control loops.

12. A system for improving movement animation of a model in a simulation, the system comprising:
a memory comprising instructions;
a processor configured to execute the instructions to:
receive a movement input for the model, the model comprising a plurality of interconnected joints having respective current locations;
determine, based on the movement input and the current locations, updated locations for each of the plurality of joints;
determine, based on at least one parameter of a proportional-integral-derivative (PID) controller for each of the plurality of joints and configured to introduce an error between the current locations and the updated locations, modified locations for each of the plurality of joints;
render the model based on the modified locations; and
reduce or disable the introduction of error to at least a subset of the plurality of joints based on receiving a user input requiring increased responsiveness or precision from the model.

13. The system of claim 12, wherein the at least one parameter comprises a proportional modifier corresponding to a present deviation, an integral modifier corresponding to an accumulation of past deviations, an input modifier corresponding to a prediction of future deviations, and a threshold angle corresponding to a threshold joint movement.

14. The system of claim 13, wherein the instructions for determining the modified locations further comprises modifying joint transformations using the proportional modifier, integral modifier, and input modifier, wherein the joint transformations are set according to the threshold angle when the modification exceeds the threshold angle.

15. The system of claim 14, wherein the instructions for determining the updated locations, determining the modified locations, and rendering the model is performed for each frame of the movement animation.

16. The system of claim 14, wherein the instructions for modifying the joint transformations further comprises interpolating between the updated location and a location corresponding to the threshold angle when the joint transformation approaches the threshold angle.

17. The system of claim 12, wherein the received movement input corresponds to a user input.

18. The system of claim 12, wherein the received movement input corresponds to a contact with another model in the simulation.

19. The system of claim 18, wherein determining the modified locations further comprises determining the modified locations based on a distance of the model from a virtual camera.

20. A non-transitory machine-readable storage medium comprising machine-readable instructions for causing a processor execute a method for improving movement animation of a model in a simulation, comprising:
receiving a movement input for the model, the model comprising a plurality of interconnected joints having respective current locations;
determining, based on the movement input and the current locations, updated locations for each of the plurality of joints;
determining, based on at least a proportional modifier, an integral modifier, and an input modifier of a proportional-integral-derivative (PID) controller configured to introduce an error between the current locations and the updated locations, modified locations for each of the plurality of joints, wherein the proportional modifier corresponds to a present deviation, the integral modifier corresponds to an accumulation of past deviations, and the input modifier corresponds to a prediction of future deviations;
rendering the model based on the modified locations; and
reducing or disabling the introduction of error to at least a subset of the plurality of joints based on receiving a user input requiring increased responsiveness or precision from the model.

* * * * *